(12) United States Patent
Abbe et al.

(10) Patent No.: US 6,378,294 B1
(45) Date of Patent: Apr. 30, 2002

(54) SYSTEM FOR ACTIVATING AN ADJUSTABLE TUBE BY MEANS OF AN ELASTIC RING FOR A THRUST NOZZLE

(75) Inventors: François Abbe, Martignas; Pierre Camy, Saint Medard en Jalles; Georges Habarou, Le Bouscat; Michel Thual, Blanquefort, all of (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/647,454
(22) PCT Filed: Jan. 28, 2000
(86) PCT No.: PCT/FR00/00195
§ 371 Date: Sep. 28, 2000
§ 102(e) Date: Sep. 28, 2000
(87) PCT Pub. No.: WO00/45040
PCT Pub. Date: Apr. 3, 2000

(30) Foreign Application Priority Data

Jan. 29, 1999 (FR) .............................................. 99 01022

(51) Int. Cl.[7] ................................................ F02K 1/12
(52) U.S. Cl. ................. 60/232; 239/265.35; 239/265.39
(58) Field of Search .............. 60/230, 232; 239/265.33, 239/265.35, 265.37, 265.39, 265.41, 265.19

(56) References Cited

U.S. PATENT DOCUMENTS

| | | | |
|---|---|---|---|
| 3,386,248 A | * 6/1968 | Pike et al. | 239/265.35 |
| 3,390,899 A | * 7/1968 | Herbert et al. | 239/265.35 |
| 3,696,999 A | 10/1972 | Desjardins et al. | |
| 3,726,480 A | 4/1973 | Miltenberger | |
| 4,363,445 A | * 12/1982 | Bouiller et al. | 239/265.35 |
| 4,993,641 A | * 2/1991 | Kehret et al. | 239/265.35 |
| H1381 H | * 12/1994 | Leavitt et al. | 239/265.35 |

* cited by examiner

Primary Examiner—Ted Kim
(74) Attorney, Agent, or Firm—Weingarten, Schurgin, Gagnebin & Lebovici LLP

(57) ABSTRACT

A steerable nozzle for a reaction engine comprises a fixed portion (1) for connection to the engine, a plurality of steerable flaps (21) mounted on one end (11) of the fixed portion, and flap steering means (3, 4, 22, 31). The nozzle is characterized in that the flap steering means comprise a resilient ring (3) having a first circumference secured to said end (11) of the fixed portion and a second circumference connected to the flaps (21), and control means (4) for moving the second circumference of the resilient ring.

22 Claims, 5 Drawing Sheets

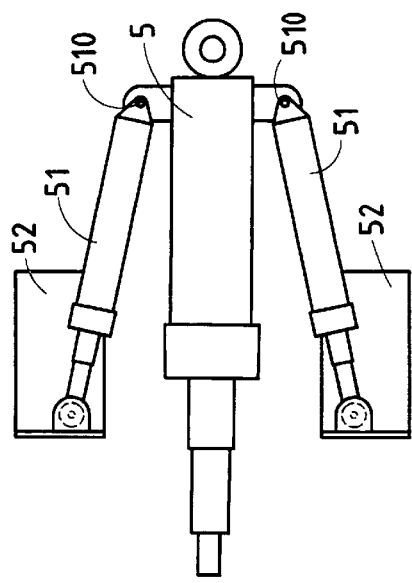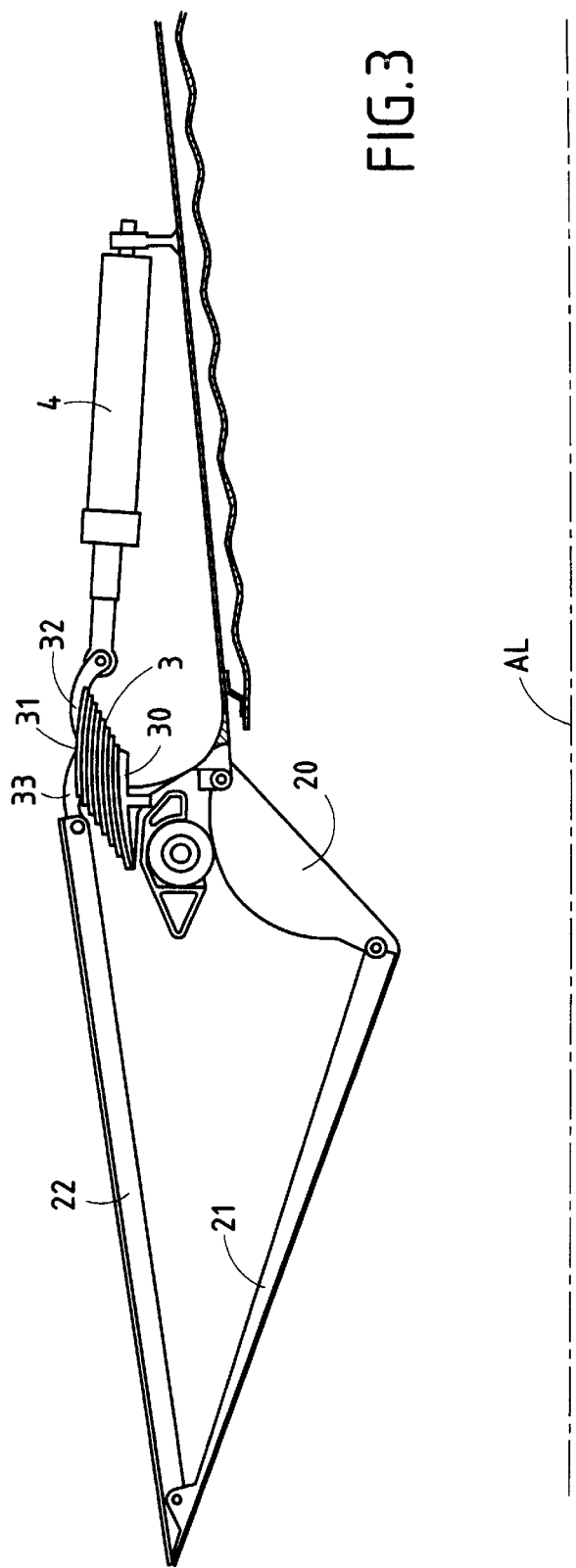

SYSTEM FOR ACTIVATING AN ADJUSTABLE TUBE BY MEANS OF AN ELASTIC RING FOR A THRUST NOZZLE

FIELD OF THE INVENTION

The present invention relates to a steerable nozzle for a reaction engine, i.e. a nozzle which is capable of steering the jet from a reaction engine. More particularly, the present invention relates to a nozzle having a fixed portion with steerable flaps hinged thereto. When mounted on an airplane, such a nozzle enables the pilot to vary the pitch and the yaw of the airplane rapidly (and indeed the roll for a two-engined airplane).

BACKGROUND OF THE INVENTION

Nozzles of this type are known in the art. Some make use of an activation ring disposed at a downstream end of the fixed portion and connected to the flaps. The activation ring is moved by means of actuators, thereby steering the flaps. Such nozzles require complicated equipment, in particular universal joints, for transmitting displacements from the activation ring to the flaps.

OBJECT AND SUMMARY OF THE INVENTION

The present invention seeks to provide a nozzle with steerable flaps having a structure that is simpler and less expensive.

To this end, the invention provides a steerable nozzle for a reaction engine, the nozzle comprising a fixed portion for attaching to the engine, a plurality of steerable flaps mounted on one end of the fixed portion, and means for steering the flaps, the nozzle being characterized in that the flap steering means comprise: a resilient ring having a first circumference secured to said end of the fixed portion and a second circumference connected to the flaps; and control means enabling the second circumference of the resilient ring to be moved relative to the first circumference.

The resilient ring of the invention serves firstly to activate the flaps under drive from control means, and secondly to take up the reaction forces. In addition, because of the annular structure of the actuator system constituted by the resilient ring, the equilibrium position of the nozzle corresponds to the rest position of the ring, thereby providing additional safety in the event of the control means breaking down.

The resilient ring can be continuous or in sectors. In addition, and typically, said first and second circumferences of the resilient ring are respectively the inner circumference and the outer circumference thereof.

The resilient ring is preferably made of a laminated material constituted by a stack of alternating layers of elastomer and of metal, a stack of alternating layers of elastomer and an organic composite material, or a stack of alternating layers of elastomer and of a thermostructural material. The elastomer is selected from elastomers capable of withstanding temperatures greater than 150° C. By way of example, an elastomer is used that is selected from fluorocarbon and fluorosilicone materials, and from hydrogenated elastomers such as hydrogenated nitrile butadiene rubber (HNBR).

Advantageously, the first circumference of the resilient ring is formed by a first rigid annular hoop serving as a fixed support to the resilient ring that is secured to the fixed portion of the nozzle, and the second circumference of the resilient ring is formed by a second rigid annular hoop serving as a moving support for the resilient ring that is connected to the control means and to the flaps. The structure formed by the resilient ring and the two rigid annular hoops constitutes a single piece, thereby minimizing operating clearances and the number of moving parts.

The control means moves the second circumference of the resilient ring directly, which movement steers the flaps.

In a first embodiment of the invention, the control means comprises first actuators of the hydraulic or electrical type, placed on the circumference of the fixed portion of the nozzle. The second rigid annular hoop has first fixing tabs to which the free ends of the first actuators are fixed, and second fixing tabs to which panels or connecting rods are attached. The flaps are hinged at first respective locations to said panels or connecting rods, and at second respective locations to the fixed portion of the nozzle.

In another embodiment of the present invention:

said flaps are controlled diverging flaps;

the nozzle also has controlled converging flaps;

the second rigid hoop has second fixing tabs to which the panels or the connecting rods are attached;

each controlled diverging flap is hinged at a first location to a panel or a connecting rod, and at a second location to a controlled converging flap; and the controlled converging flaps are also hinged to the fixed portion.

Means are then provided to steer the controlled converging flaps. These means which enable the diameter of the throat of the nozzle to be modified, i.e. the diameter of the cross-section defined by the hinged points between the converging and diverging flaps, can comprise second actuators disposed on the circumference of the fixed portion, a ring substantially perpendicular to the longitudinal axis of the nozzle and to which the free ends of the second actuators are connected, and wheels mounted in said ring, each following a cam surface on a controlled converging flap.

Advantageously, this embodiment further comprises antirotation means to restrict rotary movements of said ring about the longitudinal axis of the nozzle. The antirotation means comprise said second actuators fitted with side links each hinged at a first end to the cylinder of the corresponding actuator and at a second end to the fixed portion.

The nozzle of the invention can also have following diverging flaps and following converging flaps interposed respectively between the controlled diverging flaps and the controlled converging flaps.

BRIEF DESCRIPTION OF THE DRAWINGS

Other characteristics and advantages of the present invention will appear on reading the following detailed description of a plurality of embodiments given with reference to the accompanying drawings, in which:

FIGS. 3 and 4 show the nozzle of the invention respectively pointing upwards and downwards;

FIG. 5 is a plan view of an antirotation device used in the nozzle of the invention.

DETAILED DESCRIPTION OF PREFERRED EMBODIMENTS

Figure 1:
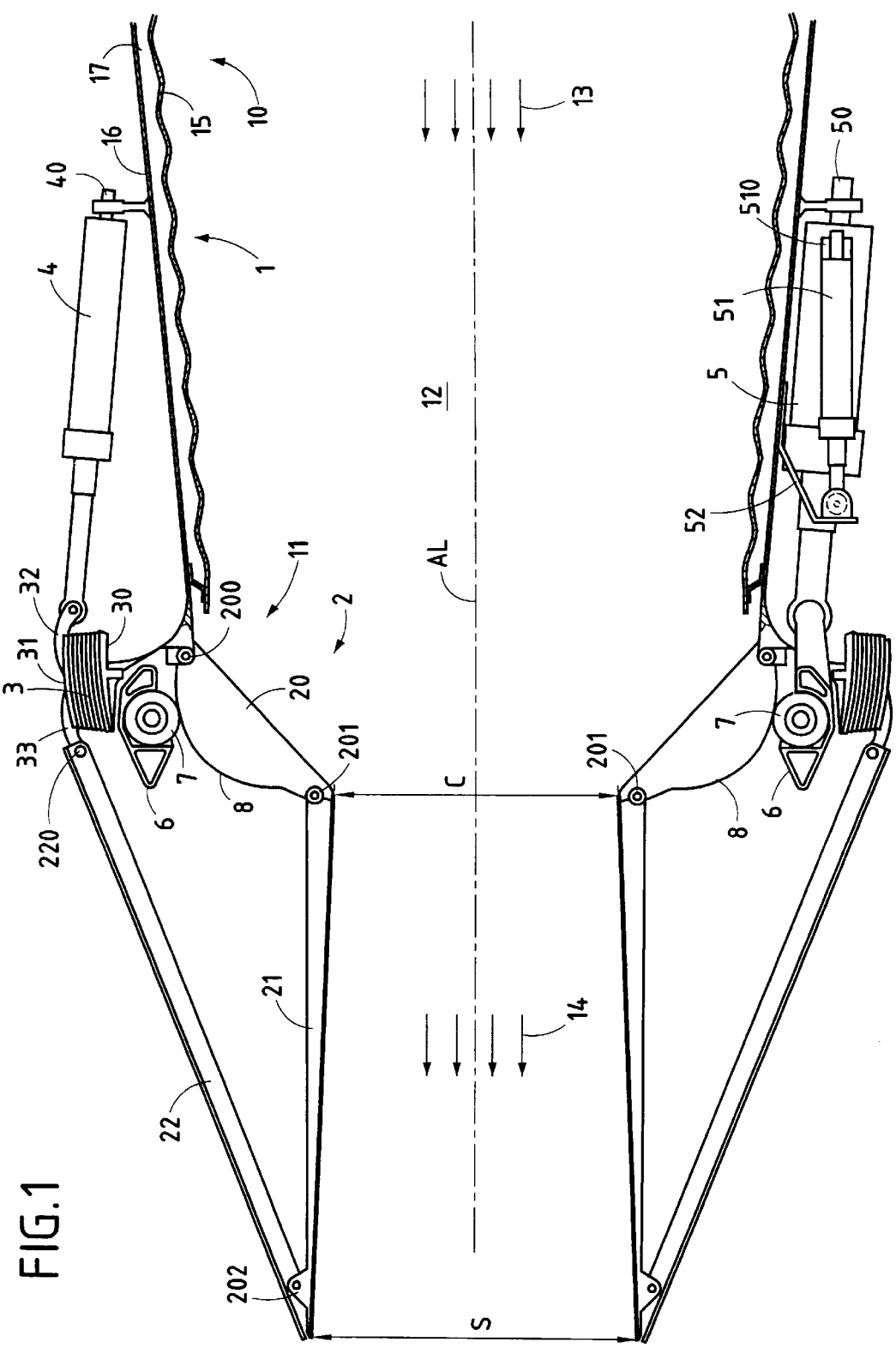
FIG. 1 is a diagrammatic section of a nozzle of the present invention in the neutral position.

FIG. 1 is a diagram of a steerable nozzle in accordance with the present invention. The nozzle comprises a fixed portion 1 which is secured at an upstream end 10 to a reaction engine (not shown), and an annular set of steerable flaps 2 hinged to a downstream end 11 of the fixed portion 1.

The fixed portion 1 comprises an ejection channel 12 which receives the gases produced by the engine and which ejects them, as represented by arrows 13 and 14 in FIG. 1. The ejection channel 12 is delimited by a substantially cylindrical corrugated liner 15. An outer wall 16 co-operates therewith to define a cooling jacket 17 in which a suitable cooling fluid circulates.

In conventional manner, the annular set of flaps 2 comprises controlled flaps, i.e. flaps whose movements are controlled directly by actuator means, and follower flaps, i.e. flaps which are interposed between the controlled flaps and which are adapted merely to follow the movements of the controlled flaps.

More particularly, the annular set of flaps 2 is constituted by a plurality of adjacent controlled and following structures mounted circularly around the circumference of the downstream end 11 of the fixed portion 1. In particular, each structure comprises a converging flap 20 and a diverging flap 21. Each of the controlled structures also includes an actuation panel or connecting rod 22 whose function is explained below. In the description below, reference is made to the controlled structures only.

In accordance with the present invention, the diverging flaps 21 are steered by means of a resilient activation ring 3 inserted between two rigid annular hoops 30 and 31. The resilient ring 3 is typically made of laminated material, i.e. of a material constituted by a stack of layers of elastomer interposed between layers of reinforcement. In the invention, the elastomer is selected from elastomers capable of withstanding temperatures greater than 150° C. By way of example, an elastomer is used that is selected from fluorocarbon and fluorosilicone materials, and from hydrogenated elastomers such as hydrogenated nitrile butadiene rubber (HNBR). The reinforcement is preferably made of metal, of an organic composite material, or of a thermostructural material such as a carbon-carbon composite material or a ceramic matrix composite material. The hoop 30 to which the inner circumference of the resilient ring 3 is fixed is secured to the fixed portion 1, and serves as a fixed support. The hoop 31 to which the outer circumference of the resilient ring 3 is fixed serves as a moving support for the resilient ring.

Figure 2:
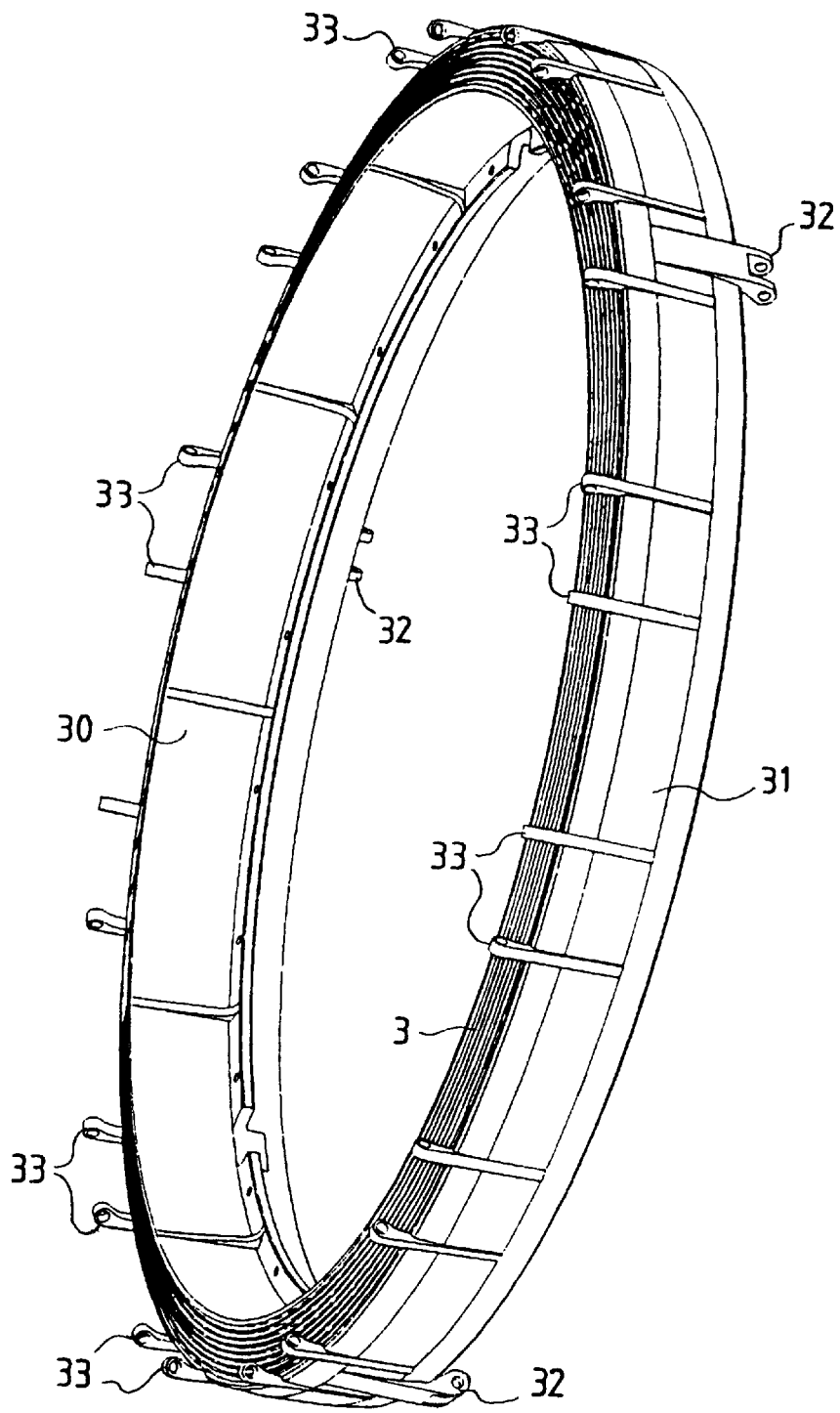
FIG. 2 is a perspective view of a resilient ring and of the associated support hoops as used in the nozzle of the invention.

FIG. 2 is a perspective view of the resilient ring 3 and of the associated support hoops 30 and 31. As shown in FIGS. 1 and 2, the moving hoop 31 has first fixing tabs 32 extending upstream relative to the nozzle, and second fixing tabs 33 extending downstream relative to the nozzle. The first fixing tabs 32 serve to connect the moving hoop 31 to actuators 4 mounted on the circumference of the fixed portion 1 of the nozzle (only one actuator 4 is shown in FIG. 1). More particularly, the ends of the rods of the actuators 4 are connected to the first fixing tabs 32 while the upstream ends 40 of the actuators 4 are hinged to the outer wall 16. The second fixing tabs 33 serve to fix the respective ends 220 of the activation panels 22 to the moving ring 31.

In a given controlled flap structure, the converging flap 20 is hinged to the fixed portion 1 at a hinge point (or line) 200. The diverging flap 21 is hinged to the downstream end of the converging flap 20 at a hinge point 201, and to the activation panel 22 at a hinge point 202 opposite from the above-mentioned end 220. The circular section defined inside the nozzle by the set of hinge points 201 and identified in FIG. 1 by reference C constitutes the throat of the nozzle. The downstream ends of the diverging flaps 21 define the outlet section of the diverging portion of the nozzle which is identified by the reference S.

Figure 4:
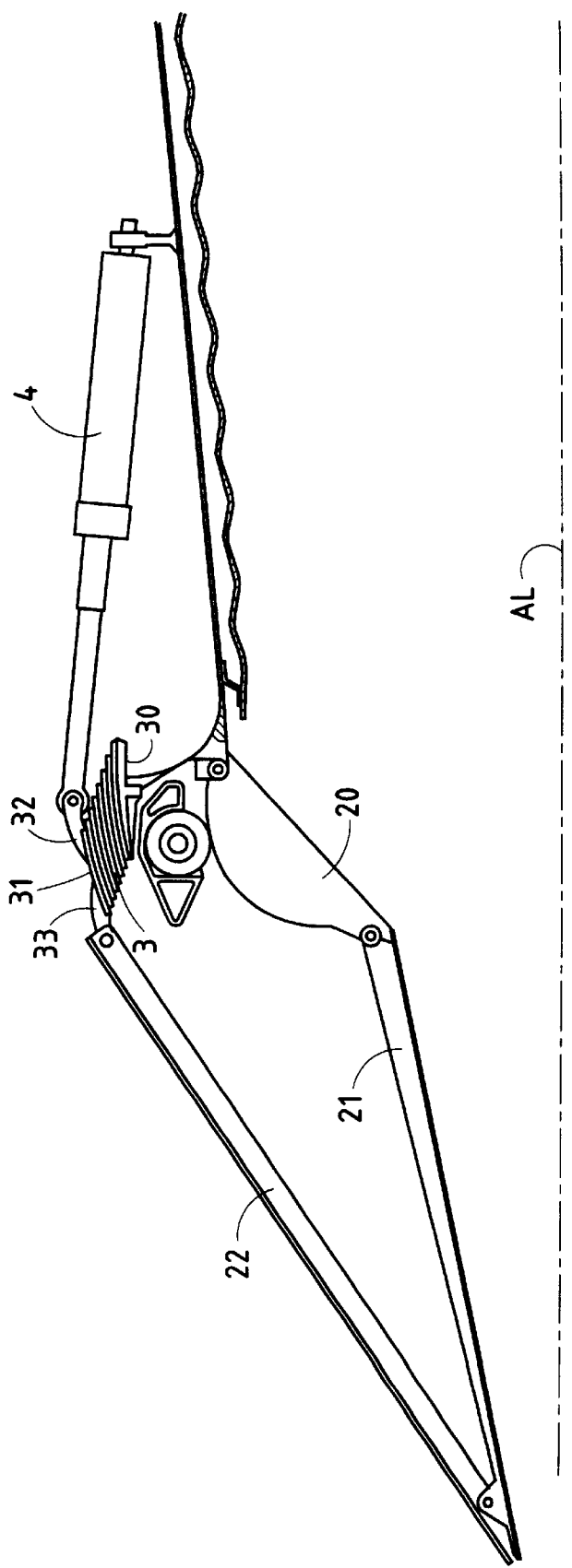

In the present invention, movement of the moving hoop 31 under drive from the actuators 4 modifies the orientation of the diverging flaps 21. These flaps pivot about the hinge points 201, with the converging flaps 20 remaining fixed insofar as the diameter of the throat is not modified simultaneously. FIGS. 3 and 4 illustrate extreme configurations in which a diverging flap 21 is steered in one direction and in the opposite direction. In the first configuration (FIG. 3), the actuator 4 is shown pulling the moving hoop 31 upstream relative to the nozzle and giving rise to corresponding twisting of the resilient ring 3, such that the flap 21 is steered in one direction. In the second configuration (FIG. 4), the actuator 4 is shown pushing the moving hoop 31 downstream relative to the nozzle, such that the flap 21 is steered in the opposite direction. The various actuators 4 are preferably distributed regularly around the circumference of the outer wall 16. In practice, at least three actuators are used that are disposed at intervals of 120°. In addition, the operation of the actuators 4 is synchronized so as to enable the jet to be steered in the desired manner. Thus, for example, in the configuration shown in FIG. 3, the other two actuators (not shown) that are disposed at 120° from the actuator 4 that is shown, are actuated to push the moving hoop 31 while the actuator 4 that is shown is pulling it.

In addition to steering the diverging flaps 21, it is possible in the present invention to modify the throat diameter C. To this end, means are provided for steering the converging flaps 20 enabling the converging flaps 20 to be pivoted about the hinge points 200. When the converging flaps 20 are pivoted about the points 200, the diverging flaps 21 also move. The flaps 20, 21 and the means for steering the converging flaps are organized in such a manner that the combined movements of the converging flaps 20 and of the diverging flaps 21 comply with a predetermined dynamic relationship, associating the throat diameter C and the outlet section diameter S of the nozzle.

The means for steering the converging flaps are conventional and typically comprise actuators 5, one of which is shown in FIG. 1, which actuators are fixed at an upstream end 50 to the fixed portion 1 and via the free ends of their rods to a ring 6. When the nozzle is in its neutral position, the axis of symmetry of the ring 6 is the longitudinal axis of the nozzle given reference AL in FIG. 1. Wheels 7 are disposed in the ring 6, each wheel following a cam surface 8 on a converging flap 20. In practice, one wheel 7 is provided per controlled converging flap. The movement of the wheels 7 over the cam surfaces 8 causes the converging flaps 20 to pivot about the hinge points 200 with the fixed portion 1, thereby changing the throat diameter C. In practice, and preferably, at least three converging flap control actuators 5 are disposed regularly around the circumference of the outer wall 16 of the fixed portion 1 and are interposed between the actuators 4.

In addition, as shown in FIGS. 1 and 5, each converging flap control actuator 5 has side links 51 mounted on either side of the actuator cylinder 5. The links 51 are hinged at their upstream ends 510 to the cylinder of the actuator 5 and at their downstream ends to respective assembly tabs 52 secured to the fixed portion 1 of the nozzle. The side links 51 co-operate with the actuators 5 to form an antirotation device which limits rotary movements of the ring 6 in a circumferential direction of the nozzle orthogonally to its longitudinal axis AL.

Figure 6:
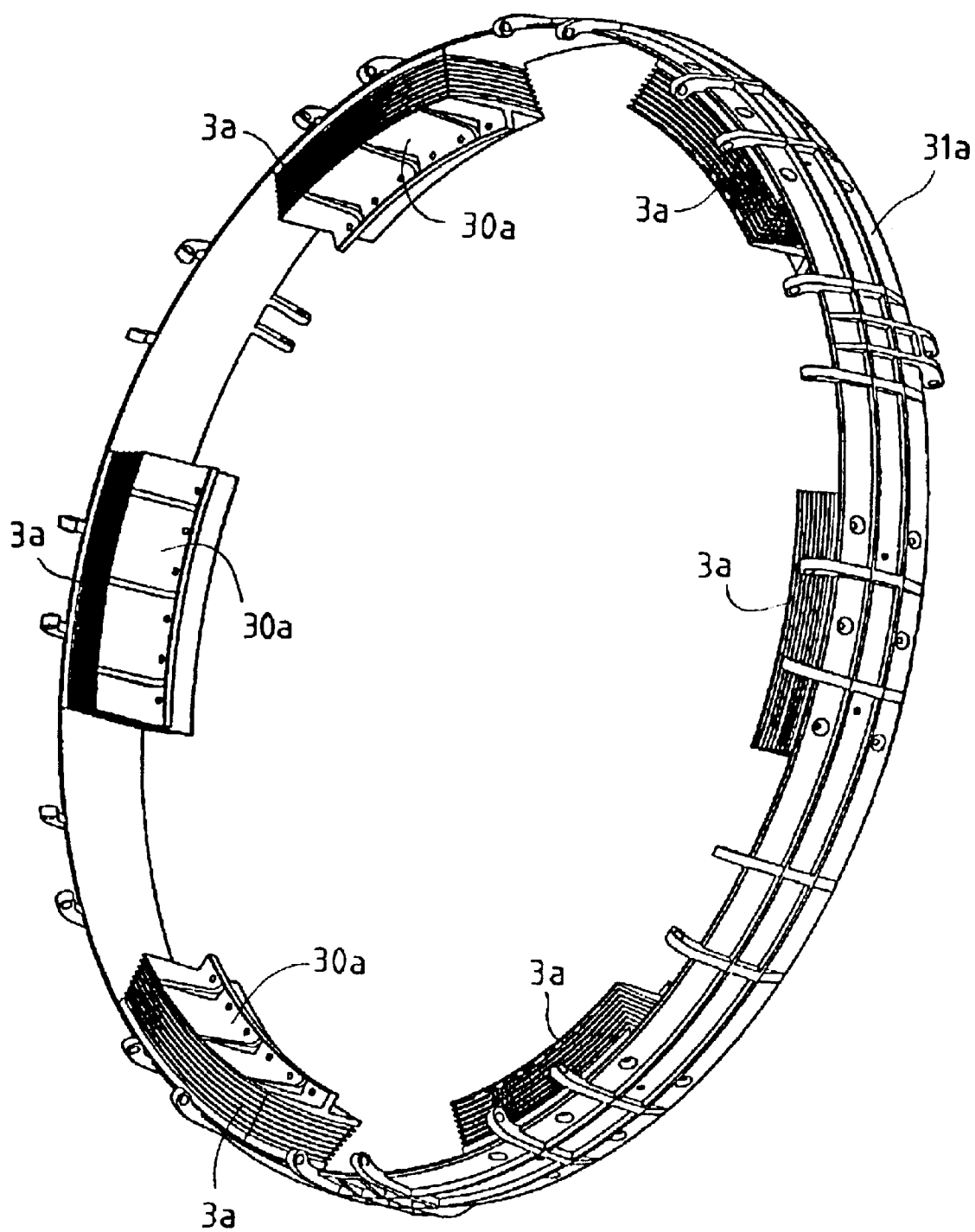
FIG. 6 is a perspective view of a resilient ring and the associated support hoops in another embodiment of the present embodiment.

The resilient ring 3 as shown in FIG. 2 is continuous. In a variant, the resilient ring 3 can be subdivided into sectors. FIG. 6 shows such a "sectorized" resilient ring constituted by a set of resilient studs 3a mounted on a moving support hoop 31a and each having a respective fixed support hoop section 30a secured to the fixed portion 1 of the nozzle.

On another topic, the nozzle as shown in FIGS. 1, 3, and 4 comprises a converging-diverging assembly made up of the converging flaps 20 and the diverging flaps 21. In a variant, it is possible for only one of the converging and diverging portions to be made up of hinged flaps. In an example where only diverging flaps 21 are retained, each diverging flap is hinged at one end 202 to a panel or connecting rod 22 attached to the moving support hoop 31 and is also hinged directly to the fixed portion 1 at an end 201 (which then coincides with point 200 in FIG. 1).

What is claimed is:

1. A steerable nozzle for a reaction engine, the nozzle comprising a fixed portion for attaching to the engine, a plurality of steerable flaps mounted on one end of the fixed portion, and means for steering the flaps, said flap steering means comprising:
    a resilient ring having a first circumference secured to said end of the fixed portion and a second circumference connected to the flaps; and
    control means for directly controlling a motion of said second circumference relative to the first circumference, said motion causing an orientation of the flaps to be modified.

2. A steerable nozzle according to claim 1, wherein the first circumference is the inner circumference of the resilient ring and the second circumference is the outer circumference of the resilient ring.

3. A steerable nozzle according to claim 1 wherein the resilient ring is made of a laminated material.

4. A steerable nozzle according to claim 3, wherein the laminated material is constituted by a stack of alternating layers of elastomer and of metal.

5. A steerable nozzle according to claim 4, wherein the elastomer is selected from elastomer capable of withstanding temperatures greater than 150° C.

6. A steerable nozzle according to claim 4, wherein the elastomer is selected from fluorocarbon and fluorosilicone materials, and hydrogenated elastomers.

7. A steerable nozzle according to claim 4, wherein the resilient ring is sectorized.

8. A steerable nozzle according to claim 3, wherein the laminated material is constituted by a stack of alternation layers of elastomer and of an organic composite material.

9. A steerable nozzle according to claim 3, wherein the laminated material is constituted by a stack of alternating layers of elastomer and of a thermostructural material.

10. A steerable nozzle according to claim 1, wherein the first circumference of the resilient ring is constituted by a first rigid hoop serving as a fixed support, secured to the fixed portion.

11. A steerable nozzle according to claim 10, wherein:
    the second circumference of the resilient ring is formed by a second rigid hoop serving as a moving support, connected to the control means and to the flaps;
    the control means comprise first actuators;
    the second hoop has first fixing tabs to which free ends of the first actuators are attached;
    the second rigid hoop has second fixing tabs to which panels or connecting rods are attached, and the flaps are hinged at first respective locations to said panels or connecting rods, and at second respective locations to the fixed portion;
    said flaps are controlled diverging flaps;
    the nozzle also has controlled converging flaps;
    the second rigid hoop has second fixing tabs to which the panels or the connecting rods are attached;
    each controlled diverging flap is hinged at a first location to a panel or a connecting rod, and at a second location to a controlled converging flap;
    the controlled converging flaps are also hinged to the fixed portion; and
    means are provided for steering the controlled converging flaps comprising second actuators disposed on the circumference of the fixed portion, a ring substantially perpendicular to a longitudinal axis of the nozzle and having free ends of the second actuators connected thereto, and wheels mounted in said ring and each following a cam surface on a respective controlled converging flap;
    and further comprising antirotation means for limiting the rotary movements of said ring about the longitudinal axis of the nozzle;
    the antirotation means comprising said second actuators which are fitted with side links each hinged at a first end to the cylinder of the corresponding actuator, and at a second end to the fixed portion;
    and further comprising following diverging flaps and following converging flaps which are interposed respectively between the controlled diverging flaps and between the controlled converging flaps.

12. A steerable nozzle according to claim 1, wherein the second circumference of the resilient ring is constituted by a second rigid hoop serving as a moving support, connected to the control means and to the flaps.

13. A steerable nozzle according to claim 12, wherein the second hoop has first fixing tabs to which free ends of the first actuators are attached.

14. A steerable nozzle according to claim 12, wherein the second rigid hoop has second fixing tabs to which panels or connecting rods are attached and the flaps are hinged at first respective locations to said panels or connecting rods and at second respective locations to the fixed positions.

15. A steerable nozzle according to claim 12, wherein:
    said flaps are controlled diverging flaps;
    the nozzle also has controlled converging flaps;
    the second rigid hoop has second fixing tabs to which the panels or the connecting rods are attached;
    each controlled diverging flap is hinged at a first location to a panel or a connecting rod, and a second location to a controlled converging flap; and
    the controlled converging flaps are also hinged to the fixed portion.

16. A steerable nozzle according to claim 15, further comprising means for steering the controlled converging flaps.

17. A steerable nozzle according to claim 16, wherein said means for steering the controlled converging flaps comprise second actuators disposed on the circumference of the fixed portion, a ring substantially perpendicular to a longitudinal axis (AL) of the nozzle and having free ends of the second actuators connected thereto, and wheels mounted in said ring and each following a cam surface on a respective controlled converging flap.

18. A steerable nozzle according to claim 17, further comprising antirotation means for limiting the rotary movements of said ring about the longitudinal axis (AL) of the nozzle.

19. A steerable nozzle according to claim 18, wherein the antirotation means comprise said second actuators which are fitted with side links each hinged at a first end to the cylinder of the corresponding actuator, and at a second end to the fixed portion.

20. A steerable nozzle according to claim 15 further comprising following diverging flaps and following converging flaps which are interposed respectively between the controlled diverging flaps and between the controlled converging flaps.

21. A steerable nozzle according to claim 1, wherein the control means comprise first actuators.

22. A steerable nozzle for a reaction engine, the nozzle comprising a fixed portion for attaching to the engine, a plurality of steerable flaps mounted on one end of the fixed portion, and means for steering the flaps, said flap steering means comprising:

a sectorized resilient ring including a rigid hoop connected to the flaps and a plurality of resilient laminated studs connected to the fixed portion of the nozzle, each resilient stud including a stack of alternating layers of elastomer and one of a metal organic composite material and thermostructural material, the elastomer being selected from elastomers capable of withstanding temperatures greater than 150° C. and from fluorocarbon and fluorosilicone materials and hydrogenated elastomers; and control means for directly controlling a motion of the rigid hoop of the resilient ring relative to the points at which the resilient studs are connected to the fixed portion of the nozzle so as to cause an orientation of the flaps to be modified.

* * * * *

UNITED STATES PATENT AND TRADEMARK OFFICE
CERTIFICATE OF CORRECTION

PATENT NO. : 6,378,294 B1
DATED : April 30, 2002
INVENTOR(S) : Francois Abbe et al.

It is certified that error appears in the above-identified patent and that said Letters Patent is hereby corrected as shown below:

<u>Title page,</u>
Item [87], "PCT Pub. Date: Apr. 3, 2000" should read
-- PCT Pub. Date: August 3, 2000 --.

Signed and Sealed this

Twenty-second Day of April, 2003

JAMES E. ROGAN
*Director of the United States Patent and Trademark Office*